(12) United States Patent
Cai et al.

(10) Patent No.: US 10,219,050 B2
(45) Date of Patent: Feb. 26, 2019

(54) VIRTUAL LINE CARDS IN A DISAGGREGATED OPTICAL TRANSPORT NETWORK SWITCHING SYSTEM

(71) Applicant: FUJITSU LIMITED, Kawasaki-shi Kanagawa (JP)

(72) Inventors: Biaodong Cai, San Ramon, CA (US); Richard Dunsmore, McKinney, TX (US); Rod Naphan, McKinney, TX (US); Sam Lisle, Fairview, TX (US); Deepak Patel, Moorpark, CA (US); Iqbal Syed, Plano, TX (US); Brent Mayberry, Austin, TX (US)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 15/419,569

(22) Filed: Jan. 30, 2017

(65) Prior Publication Data
US 2017/0310413 A1 Oct. 26, 2017

Related U.S. Application Data

(60) Provisional application No. 62/325,723, filed on Apr. 21, 2016.

(51) Int. Cl.
*H04J 14/00* (2006.01)
*H04Q 11/00* (2006.01)
(Continued)

(52) U.S. Cl.
CPC ....... *H04Q 11/0062* (2013.01); *H04B 10/032* (2013.01); *H04J 3/1652* (2013.01);
(Continued)

(58) Field of Classification Search
None
See application file for complete search history.

(56) References Cited

U.S. PATENT DOCUMENTS

2005/0123294 A1 6/2005 Mascolo et al.
2008/0089693 A1 4/2008 El-Ahmadi et al.
(Continued)

FOREIGN PATENT DOCUMENTS

| EP | 2916496 | 9/2015 |
|---|---|---|
| EP | 2958279 | 12/2015 |
| EP | 3236601 | 10/2017 |

OTHER PUBLICATIONS

Office Action received from U.S. Appl. No. 15/419,751, dated Oct. 19, 2017; 24 pages.
(Continued)

*Primary Examiner* — Zewdu A Beyen
(74) *Attorney, Agent, or Firm* — Baker Botts L.L.P.

(57) ABSTRACT

Methods and systems of a disaggregated optical transport network (OTN) switching system that include using plug-in universal (PIU) modules for OTN to Ethernet transceiving and an Ethernet fabric as a switching core are disclosed. An OTN over Ethernet module in each of the PIU modules may enable various OTN functionality to be realized using the Ethernet fabric which may include multiple Ethernet switches. A virtual line card may include a logical aggregation of a kth Ethernet switch sub-port of each of the corresponding Ethernet switch ports of each of the Ethernet switches. A virtual switch fabric may include multiple virtual line cards for the OTN switching system. Each of the virtual line cards may be associated with a virtual address that may correspond to a respective PIU module. The virtual address may include a media access control address associated with the respective PIU module.

18 Claims, 10 Drawing Sheets

(51) Int. Cl.
| | |
|---|---|
| *H04L 12/741* | (2013.01) |
| *H04L 12/931* | (2013.01) |
| *H04J 3/16* | (2006.01) |
| *H04L 29/12* | (2006.01) |
| *H04L 12/24* | (2006.01) |
| *H04B 10/032* | (2013.01) |
| *H04L 12/40* | (2006.01) |
| *H04L 12/413* | (2006.01) |

(52) U.S. Cl.
CPC ............ *H04L 12/40* (2013.01); *H04L 12/413* (2013.01); *H04L 41/0659* (2013.01); *H04L 41/0677* (2013.01); *H04L 45/745* (2013.01); *H04L 49/351* (2013.01); *H04L 49/70* (2013.01); *H04L 61/2038* (2013.01); *H04L 61/6022* (2013.01); *H04Q 11/00* (2013.01); *H04Q 11/0005* (2013.01); *H04J 2203/0012* (2013.01); *H04J 2203/0026* (2013.01); *H04J 2203/0085* (2013.01); *H04Q 11/0066* (2013.01); *H04Q 2011/0073* (2013.01)

(56) References Cited

U.S. PATENT DOCUMENTS

| | | | |
|---|---|---|---|
| 2009/0109843 | A1 | 4/2009 | Yang |
| 2009/0317073 | A1 | 12/2009 | Hotchkiss et al. |
| 2011/0255552 | A1 | 10/2011 | Ellegard |
| 2011/0280567 | A1* | 11/2011 | Lyon .................. H04B 10/0791 398/10 |
| 2012/0063312 | A1 | 3/2012 | Sarwar et al. |
| 2013/0136446 | A1 | 5/2013 | Hotshkiss et al. |
| 2013/0163982 | A1 | 6/2013 | Tochio |
| 2013/0343747 | A1 | 12/2013 | Sarwar et al. |
| 2014/0193146 | A1 | 7/2014 | Lanzone et al. |
| 2015/0023368 | A1 | 1/2015 | Connolly et al. |
| 2016/0226578 | A1 | 8/2016 | Yuan et al. |

OTHER PUBLICATIONS

Knudsen-Baas, Per Harald. "OTN switching." Norwegian University of Science and Technology; 140 pages, 2011.
Wikipedia, "Small form-factor pluggable transceiver." https://en.wikipedia.org/wiki/Small_form-factor_pluggable_transceiver; 7 pages, 2016.
Rajesh K, "Data Center Network—Top of Rack (TOR) vs End of Row (EOR) Design." http://www.excitingip.com/2802/data-center-network-top-of-rack-tor-vs-end-of-row-eor-design/; 10 pages, 2016.
Wikipedia, "QSFP." https://en.wikipedia.org/wiki/QSFP; 2 pages, 2016.
Lipscomb, F. "What Is a CFP2-ACO?" https://www.neophotonics.com/what-is-a-cfp2-aco/; 9 pages, 2016.
Hollingsworth, T. "White-Box Switches: Are you Ready?" http://www.networkcomputing.com/networking/white-box-switches-are-you-ready/1465296666; 21 pages, 2014.
Hardy, S. "Fujitsu offers CFP2-ACO coherent optical transceiver." http://www.lightwaveonline.com/articles/2015/03/fujitsu-offers-cfp2-aco-coherent-optical-transceiver.html; 2 pages, 2015.
Fujitsu Limited, "Fujitsu Significantly Expands Its 1FINITY Series of Optical Transmission System Equipment." http://www.fujitsu.com/global/about/resources/news/press-releases/2016/0323-01.html; 5 pages, 2016.
Wikipedia, "C Form-factor Pluggable." https://en.wikipedia.org/wiki/C_Form-factor_Pluggable; 3 pages, 2016.
Wikipedia, "Optical Carrier Transmission Rates." https://en.wikipedia.org/wiki/Optical_Carrier_transmission_rates, 2017; 4 pages.
Wikipedia, "VT1.5." https://en.wikipedia.org/wiki/VT1.5, 2017; 1 page, 2017.
Wikipedia, "Optical Transport Network." https://en.wikipedia.org/wiki/Optical_Transport_Network, 2016; 4 pages, 2016.
Wikipedia, "Synchronous Optical Networking." https://en.wikipedia.org/wiki/Synchronous_optical_networking, 2017; 17 pages.
International Telecommunication Union, "Interfaces for the Optical Transport Network" ITU-T G.709/Y.1331 (Jun. 2016); 244 pages.
International Telecommunication Union, "Architecture of Optical Transport Networks" ITU-T G.872 (Jan. 2017); 68 pages.
Wikipedia, "Digital Signal 1" https://en.wikipedia.org/wiki/Digital_Signal_1, 2017; 6 pages, 2017.
Extended European Search Report for European Patent Application No. 17167552.3, dated Sep. 21, 2017; 5 pages.
Extended European Search Report for European Patent Application No. 17167550.7, dated Sep. 20, 2017; 9 pages.
Office Action received from U.S. Appl. No. 15/419,751, dated Jun. 29, 2018; 17 pages.
Office Action received from U.S. Appl. No. 15/419,649, dated Apr. 10, 2018; 10 pages.

\* cited by examiner

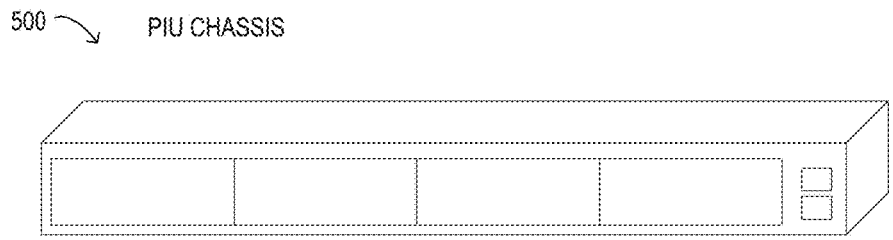
FIG. 5
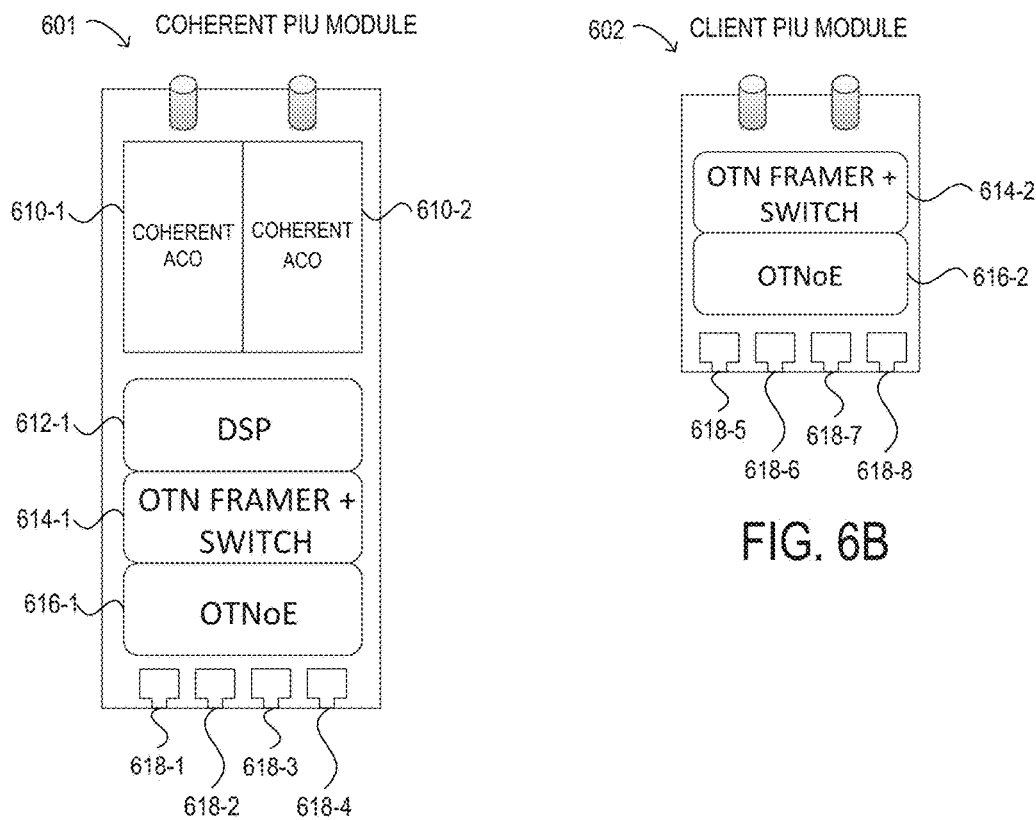
FIG. 6A
FIG. 6B

US 10,219,050 B2

VIRTUAL LINE CARDS IN A DISAGGREGATED OPTICAL TRANSPORT NETWORK SWITCHING SYSTEM

CROSS-REFERENCE TO RELATED APPLICATIONS

This application claims priority from U.S. Provisional Application No. 62/325,723 filed Apr. 21, 2016, entitled "DISAGGREGATED OPTICAL TRANSPORT NETWORK SWITCHING SYSTEM".

BACKGROUND

Field of the Disclosure

The present disclosure relates generally to optical communication networks and, more particularly, to a disaggregated optical transport network switching system that utilizes virtual line cards of a switching fabric.

Description of the Related Art

Telecommunication, cable television and data communication systems use optical transport networks (OTN) to rapidly convey large amounts of information between remote points. In an OTN, information is conveyed in the form of optical signals through optical fibers, where multiple sub-channels may be carried within an optical signal. OTNs may also include various network elements, such as amplifiers, dispersion compensators, multiplexer/demultiplexer filters, wavelength selective switches, optical switches, couplers, etc. configured to perform various operations within the network.

In particular, OTNs may be reconfigured to transmit different individual channels using, for example, optical add-drop multiplexers (OADMs). In this manner, individual channels (e.g., wavelengths) may be added or dropped at various points along an optical network, enabling a variety of network configurations and topologies.

Furthermore, typically, an optical transport network (OTN) switch is used to centrally perform electrical switching of the sub-channels carried within an optical signal to different destinations.

BRIEF DESCRIPTION OF THE DRAWINGS

For a more complete understanding of the present invention and its features and advantages, reference is now made to the following description, taken in conjunction with the accompanying drawings, in which:

FIG. 5 is a block diagram of selected elements of an embodiment of a plug-in universal chassis;

FIGS. 6A, 6B and 6C are block diagrams of selected elements of embodiments of PIU modules;

SUMMARY

Figure 1:
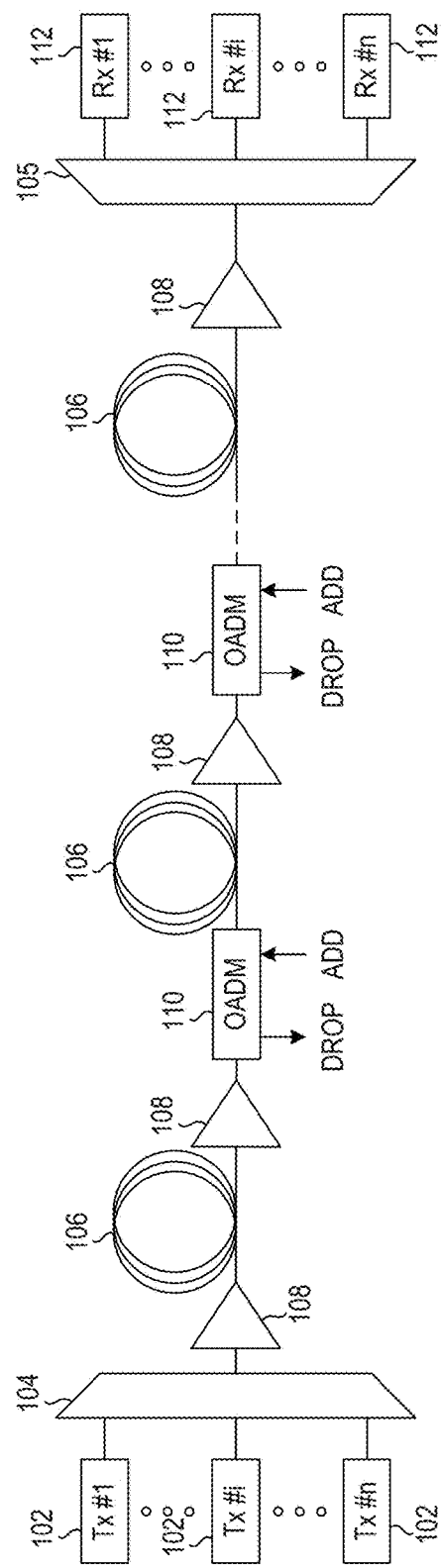
FIG. 1 is a block diagram of selected elements of an embodiment of an optical transport network.

In one aspect, a disclosed optical transport networking (OTN) switching system may include an Ethernet fabric that switches optical data units through an Ethernet fabric using plug-in universal (PIU) modules and a virtual switch fabric associated with the PIU modules. The Ethernet fabric may include a number M of Ethernet switches, each of the M Ethernet switches having a number N of Ethernet switch ports, each of the N Ethernet switch ports having a number P of Ethernet switch sub-ports, where a variable $i$ having a value ranging from 1 to M denotes the ith Ethernet switch corresponding to one of the M Ethernet switches, a variable $j$ having a value ranging from 1 to N denotes the jth Ethernet switch port corresponding to one of the N Ethernet switch ports, and a variable $k$ having a value ranging from 1 to P denotes the kth Ethernet switch sub-port corresponding to one of the P Ethernet switch sub-ports, and wherein N, M and P are greater than one. The OTN switching system may also include a PIU module having M PIU ports, where the ith PIU port of the M PIU ports corresponds to the ith Ethernet switch. The OTN switching system may switch optical data units through the Ethernet fabric using the PIU modules and a virtual switch fabric associated with the PIU modules. The virtual switch fabric may include virtual line cards. A virtual line card may include a logical aggregation of the kth Ethernet switch sub-port of each of the corresponding Ethernet switch ports of each of the M Ethernet switches. The virtual line card may be associated with a virtual address that is unique to the virtual line card in the virtual switch fabric. Each of the PIU modules may be associated with a media access control (MAC) address, and at least a portion of the MAC address may include the virtual address of the virtual line card connected to the PIU module. A virtual line card may include a logical aggregation of a plurality of consecutive Ethernet switch sub-ports beginning with the kth Ethernet switch port of each of the corresponding Ethernet switch ports of each of the M Ethernet switches.

In another aspect, a disclosed Ethernet fabric for optical transport networking switching may include a number M of Ethernet switches, each of the M Ethernet switches having a number N of Ethernet switch ports, each of the N Ethernet switch ports having a number P of Ethernet switch sub-ports, where a variable $i$ having a value ranging from 1 to M denotes the ith Ethernet switch corresponding to one of the M Ethernet switches, a variable $j$ having a value ranging from 1 to N denotes the jth Ethernet switch port corresponding to one of the N Ethernet switch ports, and a variable $k$ having a value ranging from 1 to P denotes the kth Ethernet switch sub-port corresponding to one of the P Ethernet switch sub-ports, and where N, M, and P are greater than one. The Ethernet fabric may be exclusively coupled to multiple PIU modules, each having M PIU ports including a first PIU module, where an ith PIU port of the first PIU module corresponds to the ith Ethernet switch. The Ethernet fabric may be used to switch optical data units using the PIU modules and a virtual switch fabric associated with the PIU modules. The virtual switch fabric may include virtual line cards. A virtual line card may include a logical aggregation of the kth Ethernet switch sub-port of each of the corresponding Ethernet switch ports of each of the M Ethernet switches. The virtual line card may be associated with a virtual address that is unique to the virtual line card in the virtual switch fabric. Each of the PIU modules may be associated with a MAC address, and at least a portion of the MAC address may include the virtual address of the virtual line card connected to the PIU module. The virtual line card may include a logical aggregation of a plurality of consecutive Ethernet switch sub-ports beginning with the kth Ethernet switch port of each of the corresponding Ethernet switch ports of each of the M Ethernet switches.

In yet a further aspect, a disclosed method for connecting Ethernet fabrics for optical transport networking switching may include, in an Ethernet fabric including a number M of Ethernet switches, each of the M Ethernet switches having a number N of Ethernet switch ports, each of the N Ethernet switch ports having a number P of Ethernet switch sub-ports, assigning a variable i having a value ranging from 1 to M to denote the ith Ethernet switch corresponding to one of the M Ethernet switches, where M is greater than one. The method may also include assigning a variable j having a value ranging from 1 to N to denote the jth Ethernet switch port corresponding to one of the N Ethernet switch ports, and where N is greater than one. The method may further include assigning a variable k having a value ranging from 1 to P to denote the kth Ethernet switch sub-port corresponding to one of the P Ethernet switch sub-ports, where P is greater than one. The method may also include connecting the Ethernet fabric exclusively to multiple PIU modules each having M PIU ports including a first PIU module, where an ith PIU port of the first PIU module is connected to the ith Ethernet switch, and switching optical data units through the Ethernet fabric using the PIU modules and a virtual switch fabric associated with the PIU modules. The virtual switch fabric may include virtual line cards. The method may further include defining a virtual line card comprising a logical aggregation of the kth Ethernet switch sub-port of each of the corresponding Ethernet switch ports of each of the M Ethernet switches and switching the optical data units using the virtual line card. The method may also include associating the virtual line card with a virtual address that is unique to the virtual line card in the virtual switch fabric. The method may further include associating the first PIU modules with a MAC address, where at least a portion of the MAC address may include the virtual address of the virtual line card connected to the first PIU module. The method may also include defining a virtual line card comprising a logical aggregation of a plurality of consecutive Ethernet switch sub-ports beginning with the kth Ethernet switch port of each of the corresponding Ethernet switch ports of each of the M Ethernet switches and switching the optical data units using the virtual line card.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Turning now to the drawings, FIG. 1 illustrates an example embodiment of an optical transport network 101, which may represent an optical communication system. Optical transport network 101 may include one or more optical fibers 106 configured to transport one or more optical signals communicated by components of optical transport network 101. The network elements of optical transport network 101, coupled together by fibers 106, may comprise one or more transmitters 102, one or more multiplexers (MUX) 104, one or more optical amplifiers 108, one or more optical add/drop multiplexers (OADM) 110, one or more demultiplexers (DEMUX) 105, and one or more receivers 112.

Optical transport network 101 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise a suitable type of fiber selected from a variety of different fibers for optical transmission.

Optical transport network 101 may include devices configured to transmit optical signals over optical fibers 106. Information may be transmitted and received through optical transport network 101 by modulation of one or more wavelengths of light to encode the information on the wavelength. In optical networking, a wavelength of light may also be referred to as a channel. Each channel may be configured to carry a certain amount of information through optical transport network 101.

To increase the information capacity and transport capabilities of optical transport network 101, multiple signals transmitted at multiple channels may be combined into a single wideband optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may be configured to transmit disparate channels using WDM or some other suitable multi-channel multiplexing technique, and to amplify the multi-channel signal.

Optical transport network 101 may include one or more optical transmitters (Tx) 102 configured to transmit optical signals through optical transport network 101 in specific wavelengths or channels. Transmitters 102 may comprise a system, apparatus or device configured to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101.

Multiplexer 104 may be coupled to transmitters 102 and may be a system, apparatus or device configured to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106. Optical amplifiers 108 may comprise a system, apparatus, or device configured to amplify optical signals. For example, optical amplifiers 108 may comprise an optical repeater that amplifies the optical signal. This amplification may be performed with opto-electrical (O-E) or electro-optical (E-O) conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA).

OADMs 110 may be coupled to optical transport network 101 via fibers 106. OADMs 110 comprise an add/drop module, which may include a system, apparatus or device configured to add or drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels.

In FIG. 1, optical transport network 101 may also include receivers 112 coupled to demultiplexer 105. Each receiver 112 may be configured to receive optical signals transmitted at a particular wavelength or channel, and may process the optical signals to obtain (e.g., demodulate) the information (i.e., data) that the optical signals contain. Accordingly, network 101 may include at least one receiver 112 for every channel of the network.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Additionally, polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal.

In an optical network, such as optical transport network 101 in FIG. 1, it is typical to refer to a management plane, a control plane, and a transport plane (sometimes called the physical layer). A central management host (not shown) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS), which handles one or more network elements from the perspective of the elements, a network management system (NMS), which handles many devices from the perspective of the network, and an operational support system (OSS), which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

As discussed above, the amount of information that may be transmitted over an optical network may vary with the number of optical channels coded with information and multiplexed into one signal. Accordingly, an optical fiber employing a WDM signal may carry more information than an optical fiber that carries information over a single channel. Besides the number of channels and number of polarization components carried, another factor that affects how much information can be transmitted over an optical network may be the bit rate of transmission. The higher the bit rate, the greater the transmitted information capacity. Achieving higher bit rates may be limited by the availability of wide bandwidth electrical driver technology, digital signal processor technology and increase in the required OSNR for transmission over optical transport network 101.

As shown in FIG. 1, optical transport network 101 may employ a digital wrapper technology to encapsulate existing frames of data, which may originate in a variety of native protocols, and may add packetized overhead for addressing, management, and quality assurance purposes. The resulting optical signal, in the form of optical data units (ODUs) may then be transported using individual optical wavelengths by optical transport network 101. The packetized overhead may be used to monitor and control the optical signals being transported using any of a variety of different protocols. In particular embodiments, operation of optical transport network 101 is performed according to optical transport networking (OTN) standards or recommendations promulgated by the International Telecommunications Union (ITU), such as ITU-T G.709—"Interfaces for the Optical Transport Network" and ITU-T G.872—"Architecture of the Optical Transport Network", among others. The optical wavelengths in OTN may rely on a hierarchical implementation of time-division multiplexing (TDM) to optimize carrier wavelength efficiency.

As a result of the hierarchical TDM arrangement of the optical signals in OTN, OTN switching may be performed at different sub-wavelength bit rates along optical transport network 101. As used herein, OTN switching refers to switching ODU paths of different bit rates with the ODU being the atomic unit of switching. In contrast, Internet protocol (IP) switching, such as by an IP router, refers to switching of network signals where an individual IP packet is the atomic unit of switching. In OTN switching, such as in optical transport network 101, an ODU remains in the optical domain outside of an OTN switch from network ingress to network egress. Within the OTN switch, an ODU may be accessed as an electrical domain object and OTN switching may include electrical switching technology.

It is noted that while OTN switching does generally take place in the DWDM domain, ROADMs and DWDM may be formally referred to as layer0 technologies (in The Basic Reference Model for Open Systems Interconnection, also referred to as the OSI Reference Model). In contrast, OTN may be described as a layer1 technology in the OSI Reference Model, which may operate independently of the optical wavelength domain (DWDM). For example, an OTN switch may theoretically operate over dark fiber, galvanic conductors (such as copper), or over a wireless medium (such as a millimeter-scale wave, or radio frequencies).

In general, the term "distributed" may refer to multiple nodes, or network elements (NEs), interconnected by a network and a set of collaborating nodes (or NEs). As used herein, the term "disaggregated" may refer to a NE in a distributed network that is further reorganized into a set of disaggregated sub-components in a physical sense, as compared to an aggregated physical structure, while maintaining the functionality of an integrated NE in a logical sense. In some embodiments, the disaggregated sub-components may be made openly accessible, in contrast to the aggregated physical structure.

In contrast to the centralized and embedded nature of an OTN switch, which is a unitary device at a single central location, a disaggregated OTN switching system is disclosed herein. The disaggregated OTN switching system disclosed herein may enable disaggregation of the core switching functionality with the network interface functionality. The disaggregated OTN switching system disclosed herein may enable OTN switching by relying on an internal Ethernet switching core (also referred to herein as an "Ethernet fabric"). The disaggregated OTN switching system disclosed herein may accordingly enable rapid customized configuration of a particular switching functionality at a particular location or at different remote locations. The disaggregated OTN switching system disclosed herein may enable much lower cost OTN switching than by using an OTN switch. The disaggregated OTN switching system disclosed herein may enable a much greater scalability as compared to the fixed switching capacity that is inherent in an OTN switch, because the Ethernet fabric employed may be external network infrastructure, such as data center switching systems, that can be expanded to a desired capacity. The disaggregated OTN switching system disclosed herein may be implemented using a plurality of plug-in universal (PIU) modules that provide interfacing and transceiving functionality between various OTN signals and Ethernet signals. The disaggregated OTN switching system disclosed herein may be further implemented using PIU blade chassis that have interface slots populated by a number of PIU modules, which are interconnected, powered, and controlled using the PIU blade chassis. Certain ones of PIU modules disclosed herein may enable localized direct OTN switching functionality by interconnecting two or more PIU modules in a loop-back configuration, without the use of a core Ethernet fabric.

Figure 2:
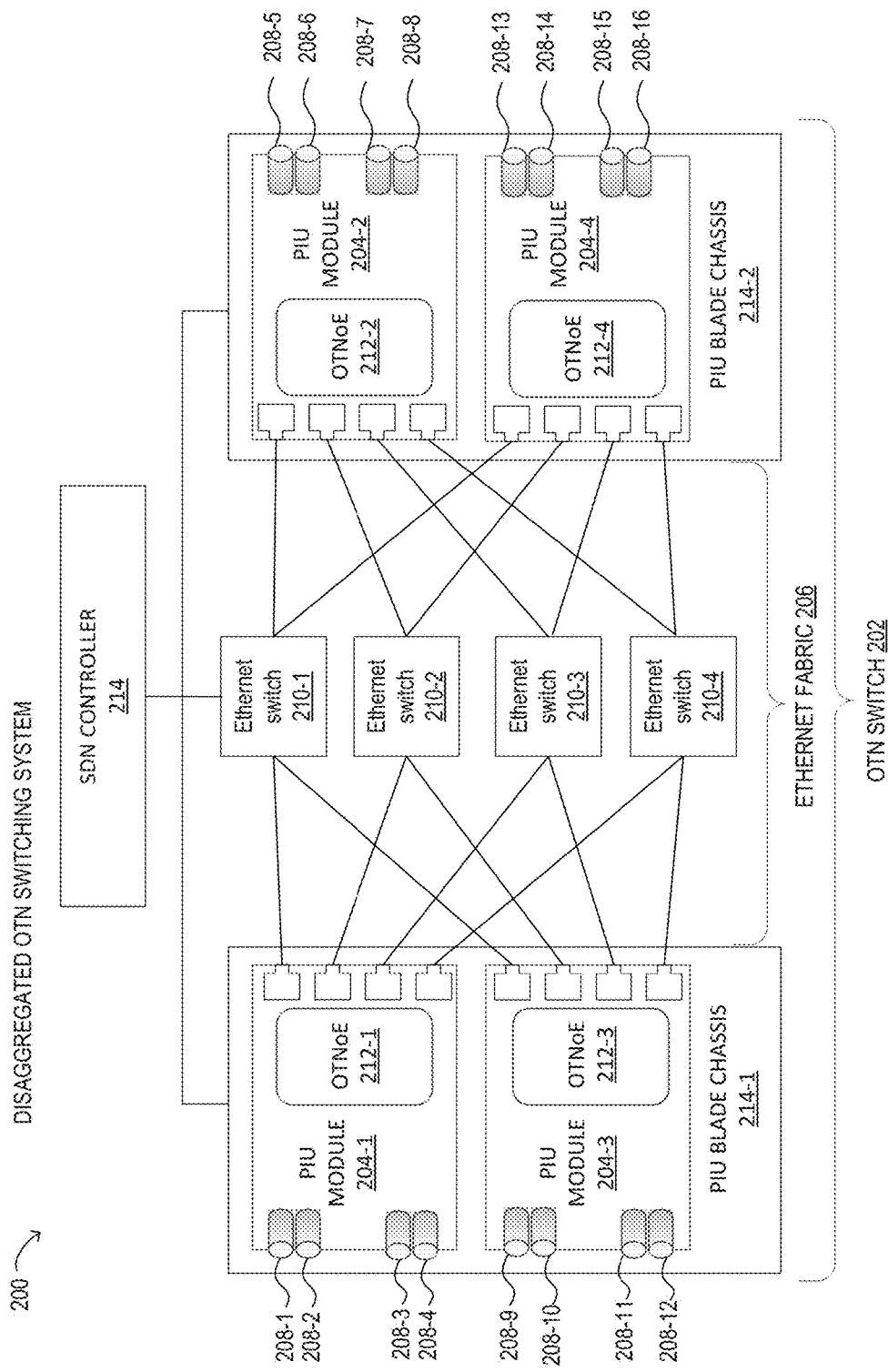
FIG. 2 is a block diagram of selected elements of an embodiment of a disaggregated OTN switching system.

Referring now to FIG. 2, a block diagram of selected elements of an embodiment of a disaggregated OTN switching system 200 is illustrated. Disaggregated OTN switching system 200 in FIG. 2 may be implemented for external switching of optical signals associated with optical transport network 101 (see FIG. 1) and is a schematic diagram for descriptive purposes and is not drawn to scale or perspective. It is noted that within disaggregated OTN switching system 200, sub-wavelength scale electrical paths may be internally switched to externally switch the optical signals.

As shown in FIG. 2, disaggregated OTN switching system 200 is configured to function as an OTN switch 202, in which optical signals connected to PIU modules 204 may be interconnected and logically switched among the PIU modules 204. At the core of disaggregated OTN switching system 200 is an Ethernet fabric 206. Each of the PIU modules 204 may function as a transceiver, with OTN inputs and outputs 208 (shown as cylindrical ports) being respectively converted to Ethernet packets that are then switchable by one or more Ethernet switches 210. Ethernet fabric 206 may employ Ethernet switches 210 in any kind of Ethernet switching architecture or Ethernet switching domain. In various embodiments, Ethernet fabric 206 may be implemented as a hierarchical spine-leaf architecture, which has become commonplace in many data center rack domains. Thus, each rack may have a so-called top-of-rack (TOR) leaf switch that operates at a relative low data throughput capacity, while the TOR leaf switches are then interconnected using a spine switch that operates at a relatively high data throughput capacity. In this manner, Ethernet fabric 206 may be hierarchically implemented using different numbers of TOR leaf switches and spine switches for any given network switching application, including aggregation into very large throughput Ethernet fabrics that may have data throughput capacity of several dozens of terabytes, or even greater.

The interconnections between PIU modules 204 and Ethernet fabric 206 may be copper cabled connections, such as 1000BASE-CX, 1000BASE-KX, 1000BASE-T, and 1000BASE-TX for 1 GB Ethernet; such as 10GBASE-CX4, small form factor pluggable+(SFP+), 10GBASE-T, and 10GBASE-KX4 for 10 GB Ethernet; and such as 100GBASE-CR10, 100GBASE-CR4, 100GBASE-KR4, and 100GBASE-KP4 for 100 GB Ethernet, among other potential types of copper-cable based ports. In some embodiments, the interconnections between PIU modules 204 and Ethernet fabric 206 may be optical fiber Ethernet connections that are supported according to a variety of Ethernet standards for optical Ethernet ports. For example, for 100 GB Ethernet interconnections to Ethernet fabric 206, the interconnections may be any one or more of 100GBASE-SR10, 100GBASE-SR4, 100GBASE-LR4, 100GBASE-ER4, 100GBASE-CWDM4, 100GBASE-PSM4, 100GBASE-ZR, 100GBASE-KR4, and 100GBASE-KP4. For example, for up to 400 GB Ethernet interconnections to the Ethernet fabric, the interconnections may be any one or more of 400GBASE-SR16, 400GBASE-DR4, 400GBASE-FR8, and 400GBASE-LR8. Furthermore, in certain embodiments, interconnections to Ethernet fabric 206 may utilize FlexEthernet (FlexE) in order to mix different transmission rates across Ethernet fabric 206.

Among the form factors for ports used in PIU modules 204 are quad small form-factor pluggable (QFSP), C form-factor pluggable (CFP, CFP2), and SFP+. For example, on the OTN line side, CFP2 ports supporting analog coherent optics (ACO) may be used in PIU modules 204, such as for 100 gigabit (100 G) or 200 gigabit (200 G) coherent OTN connections.

Each PIU module 204 in disaggregated OTN switching system 200 is further equipped with an OTN over Ethernet (OTNoE) module 212, which may be an application specific integrated circuit (ASIC), an ASSP (application specific standard product), or a field-programmable gate array (FPGA) that is customized for a particular purpose. OTNoE module 212 in PIU module 204 may provide specific functionality to enable overall operation of disaggregated OTN switching system 200 as an OTN switch. OTNoE module 212 may be enabled to implement, in the context of disaggregated OTN switching system 200, various types of OTN functionality over Ethernet fabric 206. OTNoE module 212 may support or enable functionality for OTN path redundancy and path protection switching using Ethernet fabric 206. OTNoE module 212 may support or enable functionality for concatenation of OTN path protection domains. OTNoE module 212 may support or enable functionality for distribution of OTN network paths and ODUs associated with the network paths over a 1:N Ethernet fabric connections, where one Ethernet switch is used to protect N other working Ethernet switches in case any one of the N working Ethernet switches has a failure or indicates performance of a maintenance operation that may result in an offline state. Furthermore, both 1:N and 0:N protection schemes may be supported. Given the nature of very high speed switching for both OTN applications and for Ethernet fabrics, as well as the cost and complexity of using external memory with OTNoE module 212, a latency delay variation may be experienced among Ethernet switches 210. The latency delay variation (or jitter) by Ethernet fabric 206 may be an important factor to consider when choosing a ODU path distribution scheme and a particular Ethernet fabric when a protection scheme is used. OTNoE module 212 may support or enable functionality for ensuring ODU path and data integrity over the Ethernet fabric, even when jitter occurs over Ethernet fabric 206. OTNoE module 212 may support or enable functionality for switching higher level ODUs over Ethernet fabric 206, even when the data throughput for the higher level ODUs is larger than the underlying Ethernet ports in Ethernet fabric 206. OTNoE module 212 may support or enable functionality for compressing OTN traffic to provide more efficient connections to the Ethernet fabric, while compensating for jitter and bit error rate (BER) losses that may occur over the Ethernet fabric, in order to enable using Ethernet fabric 206 for OTN switching.

Finally, in FIG. 2, a software-defined networking (SDN) controller 214 (see also FIGS. 3 and 4) is shown that coordinates operation of PIU blade chassis 214, PIU modules 204, and Ethernet fabric 206. Specifically, functionality in SDN controller 214 may be used to communicate with PIU chassis 214 and Ethernet fabric 206 for OTN switching operations. For example, SDN controller 214 may accordingly configure switching paths and switching configurations, using software commands and/or application programming interfaces (APIs), to enable operation of disaggregated OTN switching system 200 as an OTN switch. For instance, SDN controller 214 may communicate with one or more of Ethernet switches 210 to configure one or more management information bases (MIBs) that may be utilized in configuring switching paths and/or switching configurations. In one or more embodiments, SDN controller 214 may communicate with one or more of Ethernet switches 210 via a simple network management protocol (SNMP) to provide information (e.g., one or more configurations, etc.) to one or more of Ethernet switches 210 and/or to retrieve information (e.g., switch status, port status, packet collision accounting(s), packet drop accounting(s), etc.) from one or more Ethernet switches 210.

Figure 3:
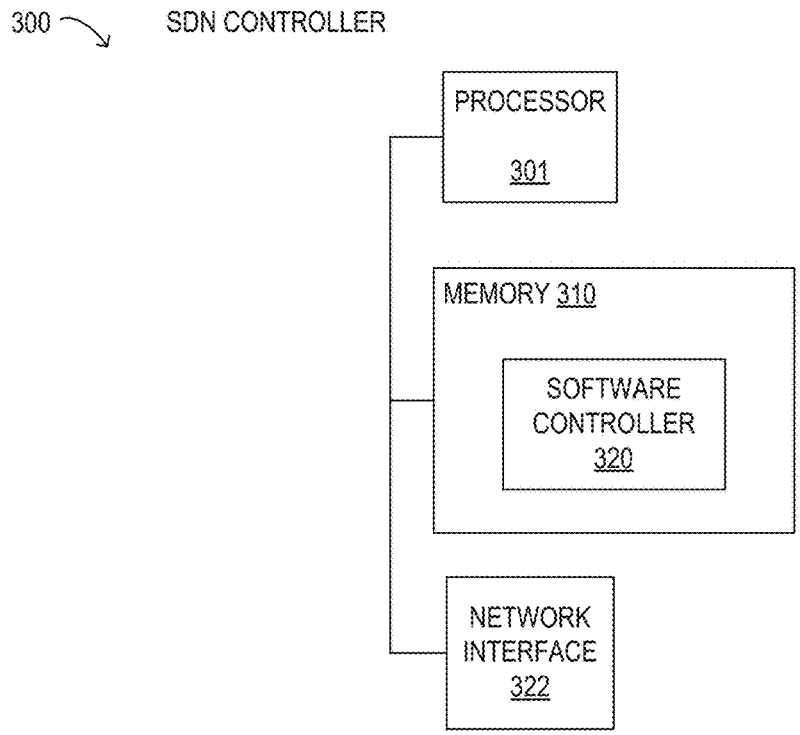
FIGS. 3 and 4 are block diagrams of selected elements of an embodiment of an SDN controller.

Referring now to FIG. 3, a block diagram of selected elements of an embodiment of SDN controller 300 is illustrated. SDN controller 300 in FIG. 3 may be implemented to control disaggregated OTN switching system 200 (see FIG. 2) and is a schematic diagram for descriptive purposes.

In FIG. 3, SDN controller 300 is represented as a computer system including physical and logical components for implementing disaggregated OTN switching system 200, as described herein, and may accordingly include a processor 301, a memory 310, and a network interface 322. Processor 301 may represent one or more individual processing units and may execute program instructions, interpret data, process data stored by memory 310 or SDN controller 300. It is noted that SDN controller 300 may be implemented in different embodiments. For example, in some embodiments, SDN controller 300 may be implemented using a network element. In particular embodiments, memory 310 may represent a software controller 320 executing on processor 301.

In FIG. 3, memory 310 may be communicatively coupled to processor 301 and may comprise a system, device, or apparatus suitable to retain program instructions or data for a period of time (e.g., computer-readable media). Memory 310 may include various types of components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, or any suitable selection or array of volatile or non-volatile memory. Non-volatile memory refers to a memory that retains data after power is turned off. It is noted that memory 310 may include different numbers of physical storage devices, in various embodiments. As shown in FIG. 3, memory 310 may include software controller 320, among other applications or programs available for execution. In one or more embodiments, SDN controller 214 (see FIG. 2) may include one or more functionalities and/or one or more structures described with reference to SDN controller 300.

Figure 4:
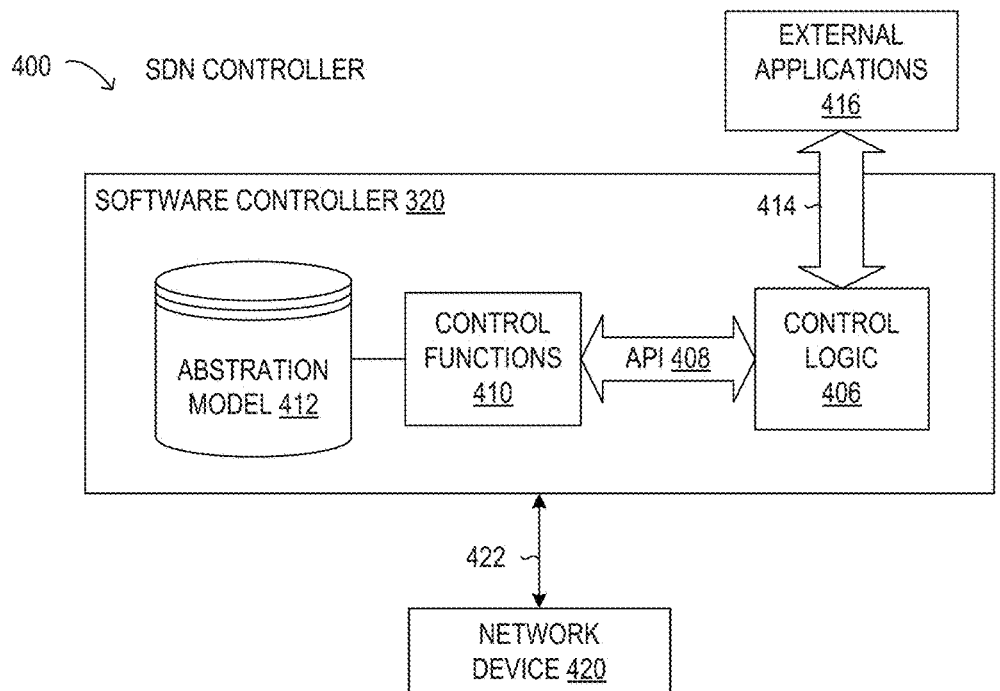

Referring now to FIG. 4, a block diagram of selected elements of an embodiment of a SDN controller 400 is illustrated. FIG. 4 shows further details of software controller 320 for performing SDN operations related to disaggregated OTN switching system 200, as described above.

In FIG. 4, software controller 320 is shown including a repository that may store any of various different abstraction models 412, selected as examples among other abstraction models for descriptive clarity. In some embodiments, abstractions models 412 are defined using YANG, which is a data modeling language for modeling configuration and state data used to manage network devices through a network configuration protocol (NETCONF). Specifically, abstraction model 412 may include a service abstraction model that may model configuration and state data for network services used with optical transport network 101. Abstraction model 412 may include a network abstraction model that may model configuration and state data for network connections used with optical transport network 101. Abstraction model 412 may include a device abstraction model that may model configuration and state data for network devices 420 used in optical transport network 101. Control functions 410 may represent various control functions for network services, network connections, and network devices 420. API 408 may enable control logic 406 to access control functions 410 for network services, network connections, and network devices 420.

As shown in SDN controller 400, API 414 may enable communication between control logic 406, as well as external applications 416. Some non-limiting examples of external applications 416 that may be used with software controller 320 include orchestrators (NCX, Anuta Networks, Inc., Milpitas, Calif., USA; Exanova Service Intelligence, CENX, Ottawa, Canada), workflow managers (Salesforce Service Cloud, salesforce.com, Inc., San Franciso, Calif., USA; TrackVia, TrackVia, Inc., Denver, Colo., USA; Integrify, Integrify Inc., Chicago, Ill., USA); and analytics applications (Cloud Analytics Engine, Juniper Networks, Inc., Sunnyvale, Calif., USA; Nuage Networks Virtualized Services Directory (VSD), Nokia Solutions and Networks Oy, Espoo, Finland).

In implementations of SDN controller 400, control logic 406 may comprise internal control logic that remains proprietary, internal, or administratively protected within software controller 320. Non-limiting examples of internal or protected portions of control logic 406 may include complex proprietary algorithms, such as for path computation, and private business logic, such as billing algorithms of the network operator. In disaggregated OTN switching system 200, control logic 406 may include functionality for communicating with the PIU chassis and the Ethernet fabric, as described above.

Furthermore, software controller 320 may interact with various network devices 420 using different network protocols. For example, software controller 320 may interact with network device 420 using software protocol 422 that is a NETCONF protocol, a command line interface (CLI), or a simple network management protocol (SNMP). Network devices 420 may represents routers, switches, or network elements that are included in optical transport network 101. As noted above, network abstraction models 412 may be repositories, such as databases with representations of functions supported by software controller 320, while the actual implementation of the functions is performed by control functions 410. Accordingly, control functions 410 may utilize the different network protocols 422 to access network devices 420.

It is noted that network devices 420 and software protocols 422 are shown in a logical view in FIG. 4 not a physical view. The actual physical connections between network devices 420 and software controller 220 may be different in different embodiments, such as using one or more network connections. In one or more embodiments, SDN controller 214 (see FIG. 2) may include one or more functionalities and/or one or more structures described with reference to SDN controller 400.

Referring now to FIG. 5, a representation of selected elements of an embodiment of a PIU chassis 500 is illustrated. PIU chassis 500 may be a rack-mounted enclosure having an internal bus and an internal processor. PIU chassis 500 may receive PIU modules via individual slots that connect a PIU module to the internal bus. The internal bus may provide power and coordination among PIU modules. In certain embodiments, PIU chassis 500 includes a network connection for direct communication to SDN controller 214 (see FIG. 2). As shown PIU chassis 500 has four slots that may be populated with individual PIU modules. It is noted that in different embodiments, PIU chassis 500 may be implemented with different numbers of slots and may be implemented in different form factors. It is noted that the PIU modules may have front side network connections for access while the PIU modules populates a slot in PIU chassis 500.

Referring now to FIG. 6A, a block diagram of selected elements of an embodiment of a coherent PIU module 601 is illustrated. FIG. 6A is a schematic illustration. Coherent PIU module 601 may populate one slot in PIU chassis 500. In the exemplary embodiment shown in FIG. 6A, coherent PIU module 601 is implemented with two analog coherent optical (ACO) transceivers 610, for example, that support 100 G or 200 G OTN lines and 100 G Ethernet. Coherent PIU module 601 may further include a DSP 612-1 and an OTN framer+switch 614-1, along with an OTNoE module 616-1 on the 100G Ethernet side, as described above. Coherent PIU module 601 may include various connector ports 618 for optical or copper wire based connections, as described above.

Referring now to FIG. 6B, a block diagram of selected elements of an embodiment of a client PIU module 602 is illustrated. FIG. 6B is a schematic illustration. Client PIU module 602 may populate one slot in PIU chassis 500. In the exemplary embodiment shown in FIG. 6B, client PIU module 602 is implemented with 16×10 G Ethernet/4×40 G Ethernet and 100 G Ethernet. Client PIU module 602 may further include an OTN framer+switch 614-2, along with an OTNoE module 616-2 on the 100 G Ethernet side, as described above. Client PIU module 602 may include various connector ports 618 for optical or copper wire based connections, as described above.

Figure 6C:
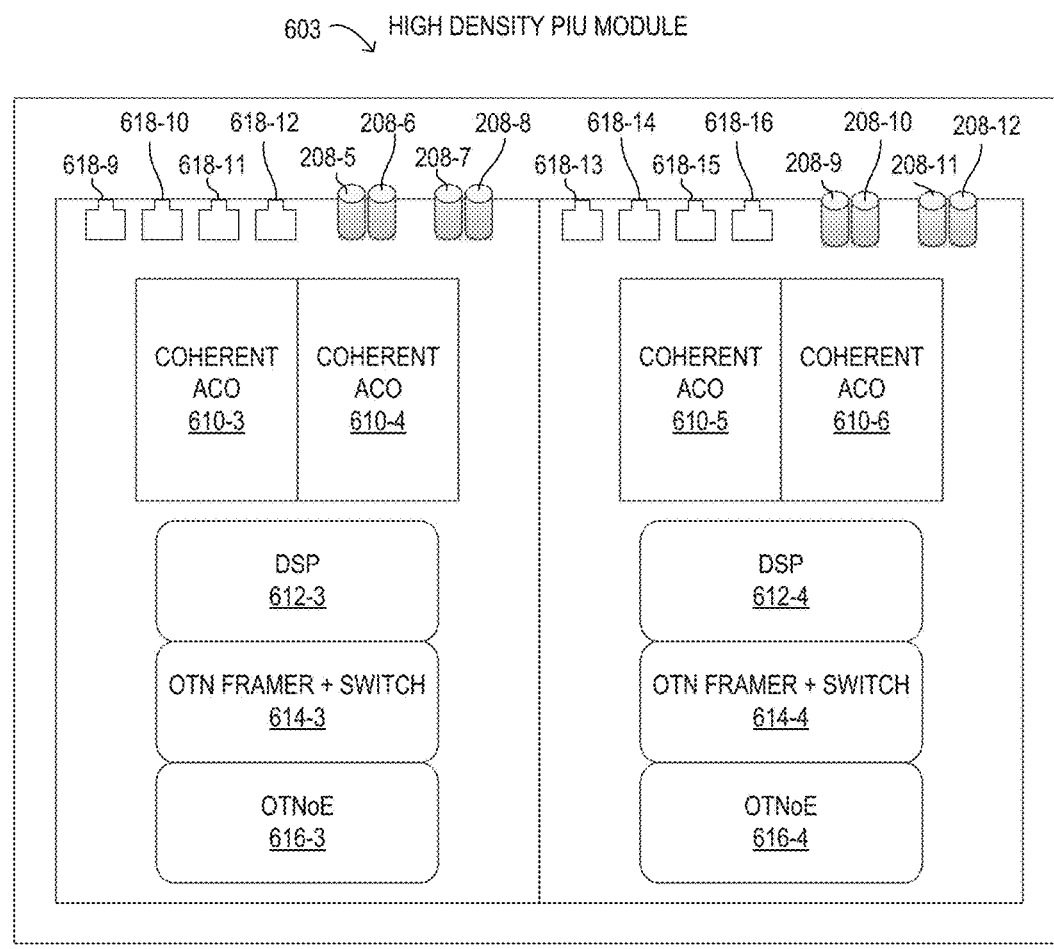

Referring now to FIG. 6C, a block diagram of selected elements of an embodiment of a high density PIU module 603 is illustrated. FIG. 6C is a schematic illustration. High density PIU module 603 may populate two slots in PIU chassis 500. In the exemplary embodiment shown in FIG. 6C, high density PIU module 603 is implemented with two submodules that may be similar to coherent PIU module 601, but where each submodule may support 2×100 G OTN lines. High density PIU module 603 may further include 1×40 G Ethernet/10×10 G Ethernet client ports, 16×10 G Ethernet ports, four coherent ACO transceivers 610-3 to 610-6, two DSPs 612-3 and 612-4, and two OTN framer+ switches 614-3 and 614-4, along with two OTNoE modules 616-3 and 616-4 on the 100 G Ethernet side, as described above. High density PIU module 603 may include various OTN inputs and outputs 208-5 to 208-12 (shown as cylindrical ports). High density PIU module 603 may also include various connector ports 618-9 to 618-16 for breaking out various optical or copper wire based connections, as described above.

Figure 7A:
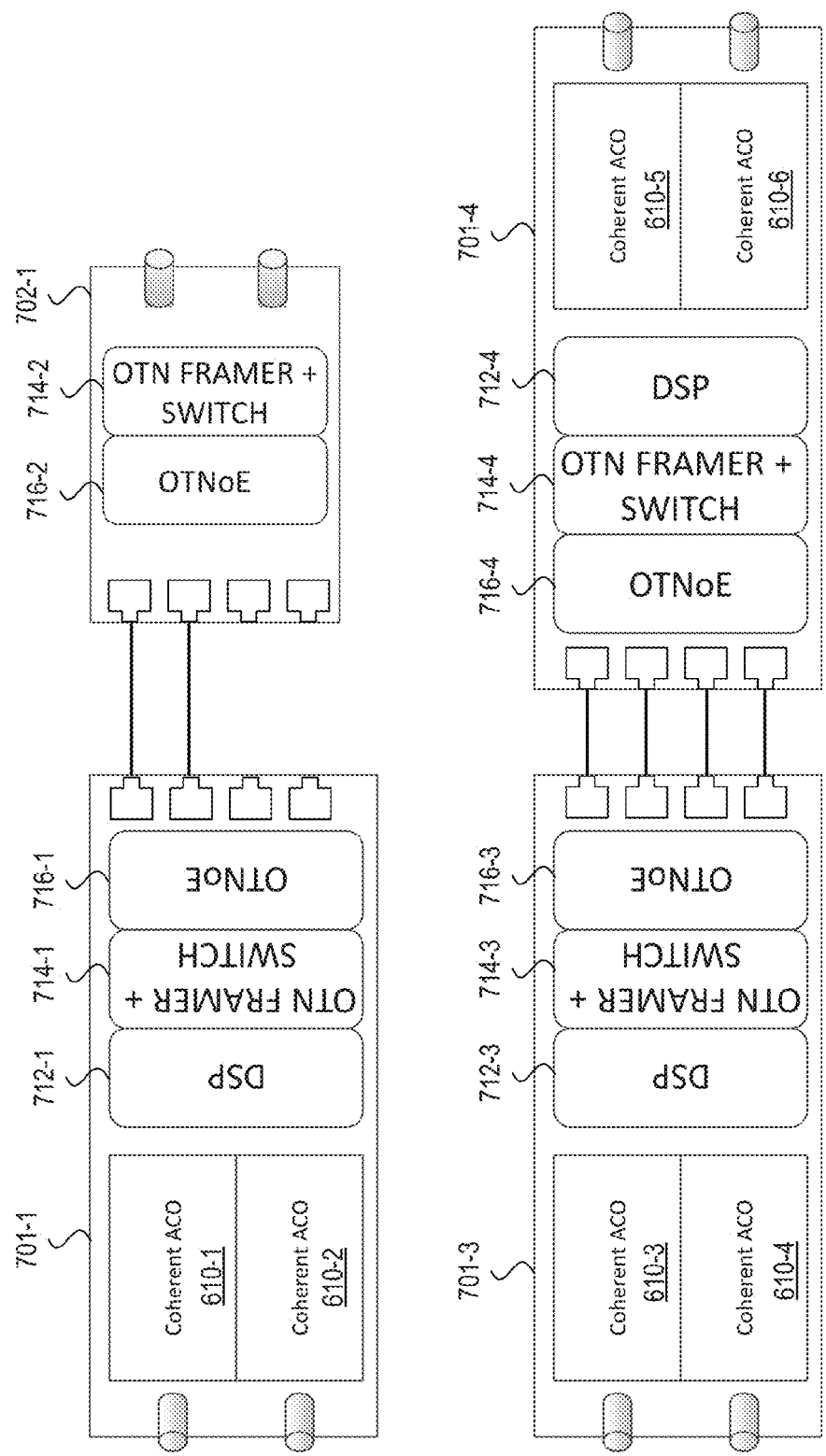
FIGS. 7A and 7B are a block diagrams of selected elements of an embodiment of local OTN switching functionality.
Figure 7B:
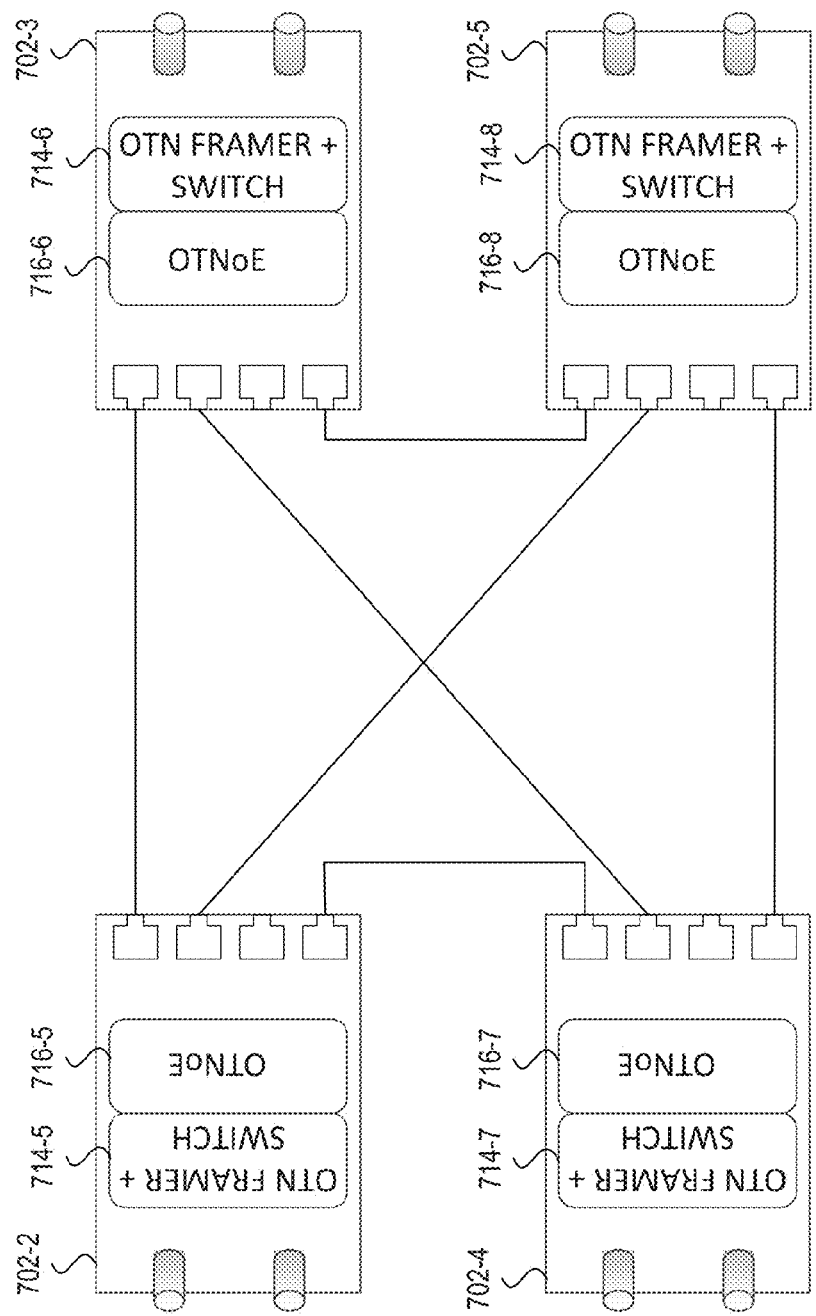

Referring now to FIG. 7A, a block diagram of selected elements of an embodiment of local switching configurations using two directly interconnected PIU modules without a core Ethernet fabric are shown. As illustrated, PIU modules 701-1 and 702-1 are connected, and PIU modules 701-3 and 701-4 are connected. PIU modules 701-1, 701-3, and 701-4 may each include two coherent ACO transceivers 610, DSPs 712, OTN framer+switches 714, and OTNoE 716. PIU module 702-1 may include OTN framer+switch 714 and OTNoE 716. In the configurations shown in FIG. 7A, OTN framer+switches 714 may perform OTN switching, along with OTNoE modules 716 among the connected modules. Although certain direct connections are shown in FIG. 7A, it will be understood that local switching configurations using PIU modules may utilize internal connections as well as mesh connection configurations, in which three or four PIU modules are directly interconnected to enable cross-connections for all participants in the mesh. For example, FIG. 7B illustrates a block diagram of selected elements of an embodiment of local switching using four directly interconnected PIU modules 702-2 to 702-5 without a core Ethernet fabric. PIU modules 702-2 to 702-5 may each include OTN framer+switch 714 and OTNoE 716. In this manner, certain local OTN bi-directional switching functionality using multiple switching nodes may be realized with low complexity and cost.

Figure 8:
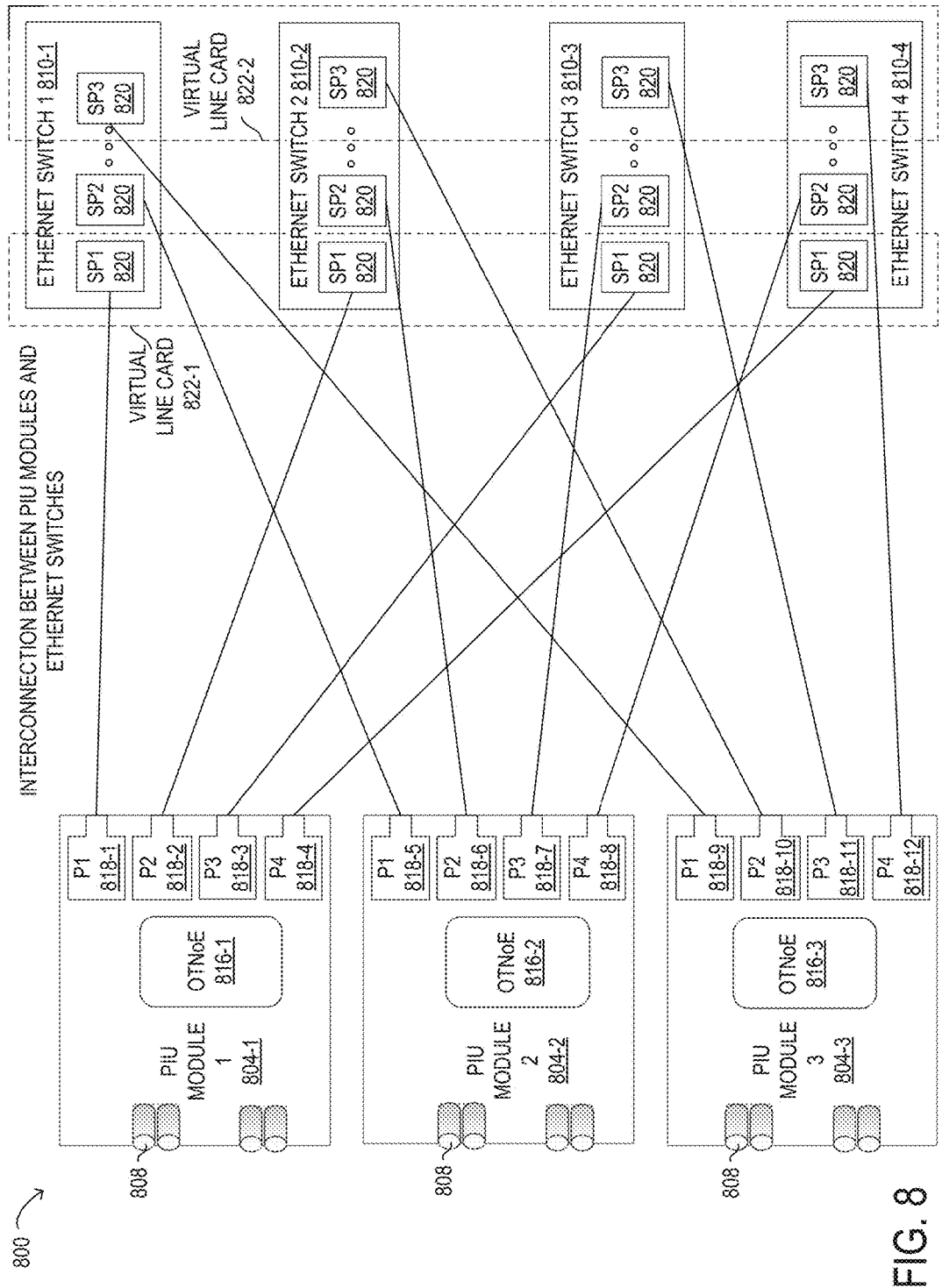
FIG. 8 is a block diagram of selected elements of an embodiment of an interconnection between plug-in universal modules and Ethernet switches.

Referring now to FIG. 8, a block diagram of selected elements of an embodiment of an interconnection 800 between PIU modules 804 and Ethernet switches 810 is illustrated. It is noted that FIG. 8 is a schematic diagram for descriptive purposes and is not drawn to scale or perspective. PIU modules 804 may each include various OTN inputs and outputs 208 (shown as cylindrical ports), an OTNoE 816, and ports P1-P4 818. As shown in FIG. 8, ports 818 of a PIU module 804 are connected to respective port 820 of Ethernet switches 810. In one example, ports P1-P4 818 of PIU module 804-1 are connected to port SP1 820 of Ethernet switches 810. In another example, ports P1-P4 818 of PIU module 804-3 are connected to port SP3 of Ethernet switches 810.

As shown in FIG. 8, each of ports 818 may include a quad small form-factor pluggable (QSFP) transceiver. For example, the QSFP transceiver may be a QSFP28 transceiver. For instance, the QSFP28 transceiver may support and/or enable a 100 GE (one hundred gigabit Ethernet) connection with Ethernet switch 810.

As shown in interconnection 800, ports 820 of respective Ethernet switches 810 may form a virtual line card 822. For example, as illustrated, ports SP1 820, of respective Ethernet switches 810, may form a virtual line card 822-1. Other virtual line cards 822 may include other Ethernet switch ports 820, of respective Ethernet switches 810. For example, Ethernet switch ports SP3 820, of respective Ethernet switches 810, may form a virtual line card 822-2.

In one or more embodiments, a virtual switch fabric may include multiple virtual line cards 822. In one example, virtual line card 822-1 may be associated with a virtual address that is unique to the virtual line card 822-1 in the virtual switch fabric. In another example, virtual line card 822-2 may be associated with a different virtual address that is also unique to the virtual line card 822-2 in the virtual switch fabric.

In one or more embodiments, each of PIU modules 804 may be associated with a unique MAC address, where at least a portion of the MAC address may include the virtual address of the virtual line card 822 that is connected to the PIU module 804, where the portion of the MAC address aligns with the virtual address of the virtual line card 822. In one example, the least significant eleven bits of the MAC address of PIU module 804 may include the virtual address of the virtual line card 822 connected to PIU module 804. In one instance, the least significant eleven bits of the MAC address of PIU module 804-1 may include "00000000001" which is the virtual address of virtual line card 822-1 connected to PIU module 804-1 for reference purposes. In another instance, the least significant eleven bits of the MAC address of PIU module 804-3 may be "00000001001" which is the virtual address of virtual line card 822-2 connected to PIU module 804-3 for reference purposes.

Though FIG. 8 illustrates specific numbers of ports 820 of Ethernet switches 810, in one or more embodiments, an Ethernet fabric may include a number M of Ethernet switches 810, each of the M Ethernet switches 810 having a number N of Ethernet switch ports 820, each of the N Ethernet switch ports 820 having a number P of Ethernet switch sub-ports, where a variable i having a value ranging from 1 to M denotes the ith Ethernet switch 810 corresponding to one of the M Ethernet switches 810, a variable j having a value ranging from 1 to N denotes the jth Ethernet switch port 820 corresponding to one of the N Ethernet switch ports 820, and a variable k having a value ranging from 1 to P denotes the kth Ethernet switch sub-port corresponding to one of the P Ethernet switch sub-ports, and where N, M, and P are greater than one. Furthermore, a PIU module 804 may have M PIU ports 818, where the ith PIU port 818 of the M PIU ports 818 corresponds to the ith Ethernet switch 810. Ethernet switch sub-ports are described in further detail with reference to FIG. 9. For example, a virtual line card 822 may include a logical aggregation of the jth Ethernet switch port 818 of each of the M Ethernet switches 810.

Moreover, an Ethernet fabric for optical transport networking switching may include a number M of Ethernet switches 810, each of the M Ethernet switches 810 having a number N of Ethernet switch ports 820, each of the N Ethernet switch ports 820 having a number P of Ethernet switch sub-ports, where a variable i having a value ranging from 1 to M denotes the ith Ethernet switch 810 corresponding to one of the M Ethernet switches 810, a variable j having a value ranging from 1 to N denotes the jth Ethernet switch port 820 corresponding to one of the N Ethernet switch ports 820, and a variable k having a value ranging from 1 to P denotes the kth Ethernet switch sub-port corresponding to one of the P Ethernet switch sub-ports, and where N, M and P are greater than one. The Ethernet fabric may be exclusively coupled to multiple PIU modules 804 each having M PIU ports 818 including a first PIU module 804, where an ith PIU port 818 of the first PIU module 804 corresponds to the ith Ethernet switch 810. The Ethernet fabric may be used to switch optical data units using the PIU modules 804 and a virtual switch fabric associated with the PIU modules 804.

In one or more embodiments, one or more PIU modules 804 may be configured with one or more small form-factor (SFP) transceivers. For example, each of the SFP transceivers may be a SFP28 transceiver that may support or enable one or more 25 GE (twenty-five gigabit Ethernet) connections with Ethernet switch 810. For instance, a QSFP28 port of Ethernet switch 810 may be divided into four 25 GE Ethernet switch sub-ports. Utilization of the Ethernet switch sub-ports may enable other virtual line cards 822 as described further with reference to FIG. 9.

Figure 9:
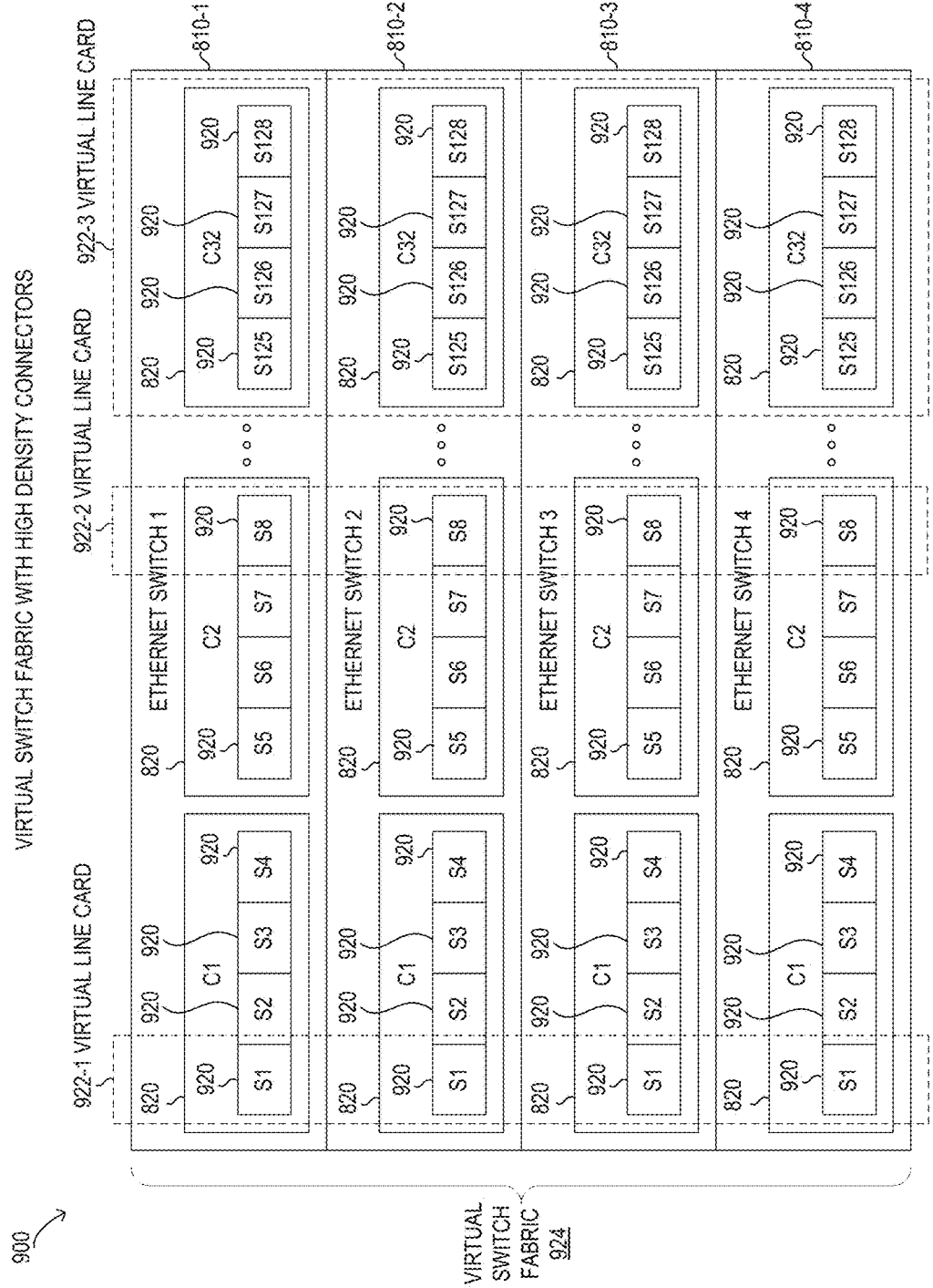
FIG. 9 is a block diagram of an embodiment of a virtual switch fabric with high density connectors.

Referring now to FIG. 9, a block diagram of an embodiment of a virtual switch fabric with high density connectors 900 is illustrated. It is noted that FIG. 9 is a schematic diagram for descriptive purposes and is not drawn to scale or perspective. As shown, port 820 of Ethernet switch 810 may be divided into four Ethernet switch sub-ports 920. For example, SFP28 transceivers 920 may divide 100 GE port 820 of Ethernet switch 810 into four 25 GE individual connections.

In one or more embodiments, ports 818 of PIU module 804 are connected to a corresponding Ethernet switch sub-port 920 of Ethernet switches 810. In one example, ports 818 of PIU module 804-1 are connected to Ethernet switch sub-ports S1-S4 920 of Ethernet switches 810. In another example, ports 818 of PIU module 804-2 are connected to Ethernet switch sub-port S8 920 of Ethernet switches 810. In the previous two examples, Ethernet switch sub-ports S1-S4 and S8 920 may be SFP28 transceivers that may, for instance, support and/or enable respective connections with Ethernet switches 810.

In one or more embodiments, Ethernet switch sub-ports 920 of respective Ethernet switches 810 may form a virtual line card 922. For example, as illustrated, Ethernet switch sub-ports S1 920 of respective Ethernet switches 810 may form a virtual line card 922-1. Other virtual line cards 922 may include other Ethernet switch sub-ports 920 of respective Ethernet switches 810. For example, Ethernet switch sub-ports S8 920 of respective Ethernet switches 810 may form a virtual line card 922-2.

As described above, a virtual switch fabric 924 may include multiple virtual line cards 922, according to one or more embodiments. In one example, virtual line card 922-1 may be associated with a virtual address that is unique to virtual line card 922-1 in the virtual switch fabric. In another example, virtual line card 922-2 may be associated with a different virtual address that is also unique to virtual line card 922-2 in the virtual switch fabric.

Moreover, each of PIU modules 804 may be associated with a unique MAC address, as above, where at least a portion of the MAC address may include the virtual address of the virtual line card 922 that is connected to the PIU module 804, where the portion of the MAC address aligns with the virtual address of the virtual line card 922, according to one or more embodiments. In one example, the least significant eleven bits of the MAC address of PIU module 804 may include the virtual address of the virtual line card 922 connected to PIU module 804. In one instance with respect to PIU module 804-1, the least significant eleven bits of the MAC address of PIU module 804-1 may include "00000000001" which is the virtual address of virtual line card 922-1 connected to PIU module 804-1 for reference purposes. In one instance with respect to PIU module 804-2, the least significant eleven bits of the MAC address of PIU module 804-2 may include "00000001000" which is the virtual address of virtual line card 922-2 connected to PIU module 804-2 for reference purposes.

In one or more embodiments, a virtual line card 922 may include a logical aggregation of multiple consecutive Ethernet switch sub-ports 920 of each of the corresponding Ethernet switch ports 820 of each of the M Ethernet switches 810 beginning with a kth Ethernet switch sub-port 920 of each of the corresponding Ethernet switch ports 820 of each of the M Ethernet switches 810. For example, a virtual line card 922-3 may include a logical aggregation of multiple consecutive Ethernet switch sub-ports 920 S125 through S128 of each of the corresponding Ethernet switch ports 820 of each of the M Ethernet switches 810. For instance, virtual line card 922-3 may utilize an entire Ethernet switch port 820 C32 of Ethernet switch ports 820 C1 through C32 on each of Ethernet switches 810, as illustrated.

Furthermore, virtual line card 922-3 may be one of multiple virtual line cards 922 of virtual switch fabric 924, according to one or more embodiments. In one example, virtual line card 922-3 may be associated with a virtual address that is unique to the virtual line card 922-3 in the virtual switch fabric 924. For instance, PIU 804-3 may be associated with a unique MAC address, as above, where at least a portion of the MAC address may include the virtual address of the virtual line card 922-3 that is connected to the PIU module 804-3, where the portion of the MAC address aligns with the virtual address of the virtual line card 922-3. In one example with respect to PIU module 804-3, the least significant eleven bits of the MAC address of PIU module 804-3 may include "00001111101" which is the virtual address of virtual line card 922-3 connected to PIU module 804-3 for reference purposes 922-3.

A PIU blade chassis may include or store information associated with PIU slot identifications, a virtual line card width, and a virtual line card address, among others. In one example, PIU blade chassis 214-1 (see FIG. 2) may include or store information in exemplary Table 1, below. In another example, PIU blade chassis 214-2 (see FIG. 2) may include or store information in exemplary Table 2, below.

TABLE 1

| PIU Slot Number | Virtual Card Width | Virtual Card Address |
|---|---|---|
| 1 | 4 | 1 |
| 2 | 4 | 9 |

TABLE 2

| PIU Slot Number | Virtual Card Width | Virtual Card Address |
|---|---|---|
| 1 | 4 | 1 |
| 2 | 4 | 9 |

A controller may maintain a database that associates PIU modules 204 and blades with virtual slots. For example, SDN controller 300 (see FIG. 3) may maintain a database, stored in memory 310 (see FIG. 3), that associates PIU modules 204 (see FIG. 2) and blades 214 (see FIG. 2) with virtual line cards. For instance, the database maintained by SDN controller 300 (see FIG. 3) may include or store information in exemplary Table 3, below.

TABLE 3

| Virtual Card Address | Interface Width | PIU Module Location | PIU Module Type |
|---|---|---|---|
| 1 | 4 | Blade 1, Slot 1 | 2 × 100G coherent |
| 2 | | | |
| 3 | | | |
| 4 | | | |
| 5 | 4 | Blade 2, Slot 1 | 2 × 100G coherent |
| 6 | | | |
| ... | ... | ... | ... |
| 127 | | | |
| 128 | | | |

In one example, information of the maintained database may be provided to the chassis blades and the PIU modules 204 during a system boot up or configuration. In another example, information of the maintained database may be provided to the chassis blades and the PIU modules during a system restart or reconfiguration.

Figure 10:
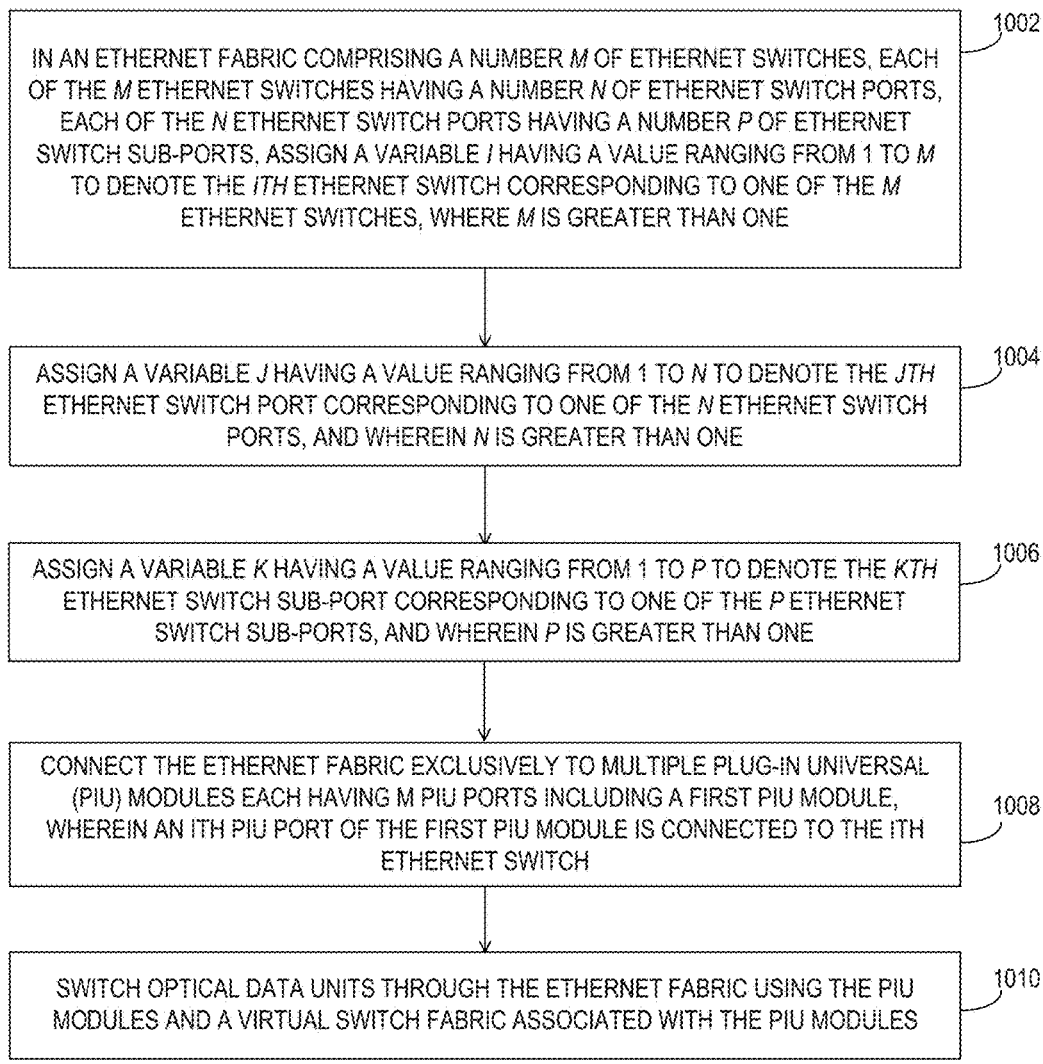
FIG. 10 is an embodiment of a method for connecting Ethernet fabrics for optical transport networking switching.

Referring now to FIG. 10, an embodiment of a method 1000 for connecting Ethernet fabrics for optical transport networking switching is illustrated. In step 1002, in an Ethernet fabric including a number M of Ethernet switches, each of the M Ethernet switches having a number N of Ethernet switch ports, each of the N Ethernet switch ports having a number P of Ethernet switch ports, a variable i having a value ranging from 1 to M to denote the ith Ethernet switch corresponding to one of the M Ethernet switches, where M is greater than one, may be assigned. In step 1004, a variable j having a value ranging from 1 to N to denote the jth Ethernet switch port corresponding to one of the N Ethernet switch ports, and where N is greater than one, may be assigned. In step 1006, a variable k having a value ranging from 1 to P to denote the kth Ethernet switch sub-port corresponding to one of the P Ethernet switch sub-ports, and where P is greater than one, may be assigned. In step 1008, the Ethernet fabric may be connected exclusively to multiple PIU modules, each having M PIU ports including a first PIU module, where an ith PIU port of the first PIU module is connected to the ith Ethernet switch. In step 1010, optical data units may be switched through the Ethernet fabric using the PIU modules and a virtual switch fabric associated with the PIU modules.

As disclosed herein, methods and systems for a disaggregated OTN switching system include using PIU modules for OTN to Ethernet transceiving and an Ethernet fabric as a switching core. A customized OTN over Ethernet module in the PIU modules enables various OTN functionality to be realized using the Ethernet fabric.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An optical transport networking switching system comprising:
    an Ethernet fabric including a number M of Ethernet switches, each of the M Ethernet switches having a number N of Ethernet switch ports, each of the N Ethernet switch ports having a number P of Ethernet switch sub-ports, wherein a variable i having a value ranging from 1 to M denotes the ith Ethernet switch corresponding to one of the M Ethernet switches, a variable j having a value ranging from 1 to N denotes the jth Ethernet switch port corresponding to one of the N Ethernet switch ports, and a variable k having a value ranging from 1 to P denotes the kth Ethernet switch sub-port corresponding to one of the P Ethernet switch sub-ports, and wherein N, M, and P are greater than one; and
    a plug-in universal (PIU) module having M PIU ports, wherein the ith PIU port of the M PIU ports corresponds to the ith Ethernet switch,
    wherein the optical transport networking switching system switches optical data units through the Ethernet fabric using the PIU modules and a virtual switch fabric associated with the PIU modules.

2. The optical transport networking switching system of claim 1, wherein the virtual switch fabric comprise virtual line cards.

3. The optical transport networking switching system of claim 2, wherein a virtual line card comprises a logical aggregation of the kth Ethernet switch sub-port of each of the corresponding Ethernet switch ports of each of the M Ethernet switches.

4. The optical transport networking switching system of claim 3, wherein the virtual line card is associated with a virtual address that is unique to the virtual line card in the virtual switch fabric.

5. The optical transport networking switching system of claim 4, wherein each of the PIU module is associated with a media access control (MAC) address, and wherein at least a portion of the MAC address includes the virtual address of the virtual line card connected to the PIU module.

6. The optical transport networking switching system of claim 2, wherein a virtual line card comprises a logical aggregation of a plurality of consecutive Ethernet switch sub-ports beginning with the kth Ethernet switch port of each of the corresponding Ethernet switch ports of each of the M Ethernet switches.

7. An Ethernet fabric for optical transport networking switching, the Ethernet fabric comprising:
    a number M of Ethernet switches, each of the M Ethernet switches having a number N of Ethernet switch ports, each of the N Ethernet switch ports having a number P of Ethernet switch sub-ports, wherein a variable i having a value ranging from 1 to M denotes the ith Ethernet switch corresponding to one of the M Ethernet switches, a variable j having a value ranging from 1 to N denotes the jth Ethernet switch port corresponding to one of the N Ethernet switch ports, and a variable k having a value ranging from 1 to P denotes the kth Ethernet switch sub-port corresponding to one of the P Ethernet switch sub-ports, and wherein N, M, and P are greater than one,
    wherein the Ethernet fabric is exclusively coupled to a plurality of plug-in universal (PIU) modules each having M PIU ports including a first PIU module, wherein an ith PIU port of the first PIU module corresponds to the ith Ethernet switch,
    wherein the Ethernet fabric is used to switch optical data units using the PIU modules and a virtual switch fabric associated with the PIU modules.

8. The Ethernet fabric of claim 7, wherein the virtual switch fabric comprise virtual line cards.

9. The Ethernet fabric of claim 8, wherein a virtual line card comprises a logical aggregation of the kth Ethernet switch sub-port of each of the corresponding Ethernet switch ports of each of the M Ethernet switches.

10. The Ethernet fabric of claim 9, wherein the virtual line card is associated with a virtual address that is unique to the virtual line card in the virtual switch fabric.

11. The Ethernet fabric of claim 10, wherein each of the PIU module is associated with a media access control (MAC) address, and wherein at least a portion of the MAC address includes the virtual address of the virtual line card connected to the PIU module.

12. The Ethernet fabric of claim 8, wherein a virtual line card comprises a logical aggregation of a plurality of consecutive Ethernet switch sub-ports beginning with the kth Ethernet switch port of each of the corresponding Ethernet switch ports of each of the M Ethernet switches.

13. A method for connecting Ethernet fabrics for optical transport networking switching, the method comprising:
- in an Ethernet fabric comprising a number M of Ethernet switches, each of the M Ethernet switches having a number N of Ethernet switch ports, each of the N Ethernet switch ports having a number P of Ethernet switch sub-ports,
- assigning a variable i having a value ranging from 1 to M to denote the ith Ethernet switch corresponding to one of the M Ethernet switches, wherein M is greater than one;
- assigning a variable j having a value ranging from 1 to N to denote the jth Ethernet switch port corresponding to one of the N Ethernet switch ports, and wherein N is greater than one;
- assigning a variable k having a value ranging from 1 to P to denote the kth Ethernet switch sub-port corresponding to one of the P Ethernet switch sub-ports, wherein P is greater than one;
- connecting the Ethernet fabric exclusively to a plurality of plug-in universal (PIU) modules each having M PIU ports including a first PIU module, wherein an ith PIU port of the first PIU module is connected to the ith Ethernet switch; and
- switching optical data units through the Ethernet fabric using the PIU modules and a virtual switch fabric associated with the PIU modules.

14. The method of claim 13, wherein the virtual switch fabric comprise virtual line cards.

15. The method of claim 14, further comprising:
- defining a virtual line card comprising a logical aggregation of the kth Ethernet switch sub-port of each of the corresponding Ethernet switch ports of each of the M Ethernet switches; and
- switching the optical data units using the virtual line card.

16. The method of claim 15, further comprising:
- associating the virtual line card with a virtual address that is unique to the virtual line card in the virtual switch fabric.

17. The method of claim 16, further comprising:
- associating the first PIU module with a media access control (MAC) address, wherein at least a portion of the MAC address includes the virtual address of the virtual line card connected to the PIU module.

18. The method of claim 14, further comprising:
- defining a virtual line card comprising a logical aggregation of a plurality of consecutive Ethernet switch sub-ports beginning with the kth Ethernet switch port of each of the corresponding Ethernet switch ports of each of the M Ethernet switches; and
- switching the optical data units using the virtual line card.

* * * * *